United States Patent [19]

Poncha et al.

[11] Patent Number: 4,738,836
[45] Date of Patent: Apr. 19, 1988

[54] PREPARATION OF HIGH BULK DENSITY ANHYDROUS SODIUM CARBONATE CRYSTALS

[75] Inventors: Rustom P. Poncha, Cheektowaga; Ronald E. Sorg, Getzville, both of N.Y.

[73] Assignee: General Chemical Corporation, Parsippany, N.J.

[21] Appl. No.: 923,249

[22] Filed: Oct. 27, 1986

[51] Int. Cl.$^4$ .............. C01D 7/12; C01D 7/22; C01D 7/26

[52] U.S. Cl. .............. 423/206 T; 23/302 T; 423/421

[58] Field of Search .............. 423/206 T, 421; 23/302 T

[56] References Cited

U.S. PATENT DOCUMENTS

| | | | |
|---|---|---|---|
| 1,992,532 | 2/1935 | Kuhnert | 423/422 |
| 2,442,584 | 6/1948 | Calmon | 423/206 T |
| 3,459,497 | 8/1969 | Coglaiti, Jr. et al. | 423/206 T |
| 3,705,790 | 12/1972 | Garofano et al. | 423/206 T |
| 3,725,014 | 4/1973 | Poncha et al. | 423/206 T |
| 3,796,794 | 3/1974 | Ilardi | 423/421 |
| 3,838,189 | 9/1974 | Sopchak et al. | 423/421 |
| 3,870,780 | 3/1975 | Guptill | 423/421 |
| 3,991,160 | 11/1976 | Gancy et al. | 423/421 |
| 4,019,872 | 4/1977 | Walden | 423/206 |
| 4,022,867 | 5/1977 | Gancy et al. | 423/421 |
| 4,039,618 | 8/1977 | Gancy et al. | 423/421 |
| 4,044,097 | 8/1977 | Gancy et al. | 423/206 T |
| 4,374,102 | 2/1983 | Connelly et al. | 423/206 |
| 4,472,280 | 9/1984 | Keeney | 423/206 |

FOREIGN PATENT DOCUMENTS 8105318 6/1979 Japan .

*Primary Examiner*—Gary P. Straub
*Attorney, Agent, or Firm*—Arthur J. Plantamura

[57] ABSTRACT

Sodium carbonate having a high bulk density and pseudo-cubic crystal structure is prepared from impure trona purge liquors from the crystallizers containing high concentration of organics, silica and sulfate by a sequence of steps involving (1) treatment of the liquors with MgO; (2) separation of the treated liquor from the insoluble reaction products; (3) addition of Ca and Mg compounds to the liquor; (4) evaporating the solution to obtain sodium carbonate monohydrate crystals; (5) separating the crystals from the mother liquor; and (6) heating the crystals at temperature of about 150°–200° C. to convert to dense ash.

7 Claims, 2 Drawing Sheets

PREPARATION OF HIGH BULK DENSITY ANHYDROUS SODIUM CARBONATE CRYSTALS

This invention relates to the preparation of relatively pure anhydrous sodium carbonate crystals from impure trona purge liquors.

BACKGROUND OF THE INVENTION

Trona ore used for the manufacture of soda ash consists mainly of sodium sesquicarbonate and insoluble matter in the form of shale. The shale contains various constituents such as organic kerogeneous matter (about 0.2% as C); dolomite (about 5.5%); and silica bearing materials (quartz about 1.1%, feldspar about 3%, clay about 0.5%).

In the production of soda ash the ore is calcined at about 180° C. to decompose the sodium sesquicarbonate to sodium carbonate.

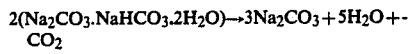

During calcination, a part of the silica contained in the ore is converted to soluble silicates, and the organic kerogeneous matter is converted into soluble organic compounds. The calcined ore is dissolved in water or dilute soda liquor to give a saturated solution of 30% $Na_2CO_3$ and the soluble impurities mainly silica and organics. Other minor soluble impurities consist of NaCl and $Na_2SO_4$. The insoluble material is removed by settling and filteration, and sodium carbonate monohydrate is recovered by evaporative crystallization. The concentration of soluble impurities in the mother liquor increases to ~10,000 ppm $SiO_2$ (basis $Na_2CO_3$) and ~4000 ppm C (basis $Na_2CO_3$). To avoid contamination and deterioration of crystal shape by the impurities, a portion of the liquor must be purged. This results in a loss of about 10% of the soda values. The purge liquor along with other waste streams from the plant is generally stored in ponds which use up large areas of land.

While various methods have been proposed to provide an economically viable system to recover the trona process liquor and, to minimize waste accumulation, none has been heretofore satisfactory.

One of the methods for the recovery of soda values from purge liquor consists in cooling the liquor to below 35° C. to crystallize out the $Na_2CO_3$ in the form of decahydrate crystals. The decahydrate rejects most of the impurities and can be redissolved in the crystallizer liquors. However, this scheme requires additional capital expense for sizable equipment to separate the decahydrate crystals. Also, such sizable equipment must be operated within close limits which is difficult.

In another method, as disclosed in U.S. Pat. No. 4,044,097, the purge liquor is treated with MgO, $Al_2O_3$, bauxite, insolubles from calcined trona ore or mixtures thereof, evaporated to dryness and heated to 300°–600° C. to insolubilize the silica and to decompose the organic content. The calcined mixture is thereafter leached with water or with a solution of sodium carbonate to recover the soda ash values. This process is relatively energy intensive because it requires the solution to be evaporated to dryness and further requires heating the residue to a high temperature to decompose the organic constituents.

It is thus apparent that a need exists for a more effective and economical method for deriving pure anhydrous sodium carbonate crystals from the impure process liquors.

SUMMARY OF THE INVENTION

In accordance with the invention, pure sodium carbonate having a high bulk density and pseudo-cubic crystal structure is prepared from an impure trona purge liquor. In the process of the invention, the starting material, purge liquor at about 100° C., is treated with MgO. The soluble silica reacts with the MgO to form insoluble magnesium silicate which is separated from the liquor. The liquor is then treated with small amounts of Ca and Mg salts and evaporated to give crystals of sodium carbonate monohydrate. The monohydrate is then heated to convert to dense ash.

The removal from the purge liquor of the high concentrations of organic material, silica and sulfate is effected by the following sequence of operations:
(1) treating the trona purge liquor with MgO;
(2) separating the treated liquor from the insoluble reaction products;
(3) adding Ca and Mg compounds to the liquor;
(4) evaporating the solution to obtain sodium carbonate monohydrate crystals;
(5) separating the crystals from the mother liquor; and
(6) heating the crystals at about 150°–200° C. to convert the crystals to a dense ash product.

DESCRIPTION OF THE PREFERRED EMBODIMENT

Figure 1:
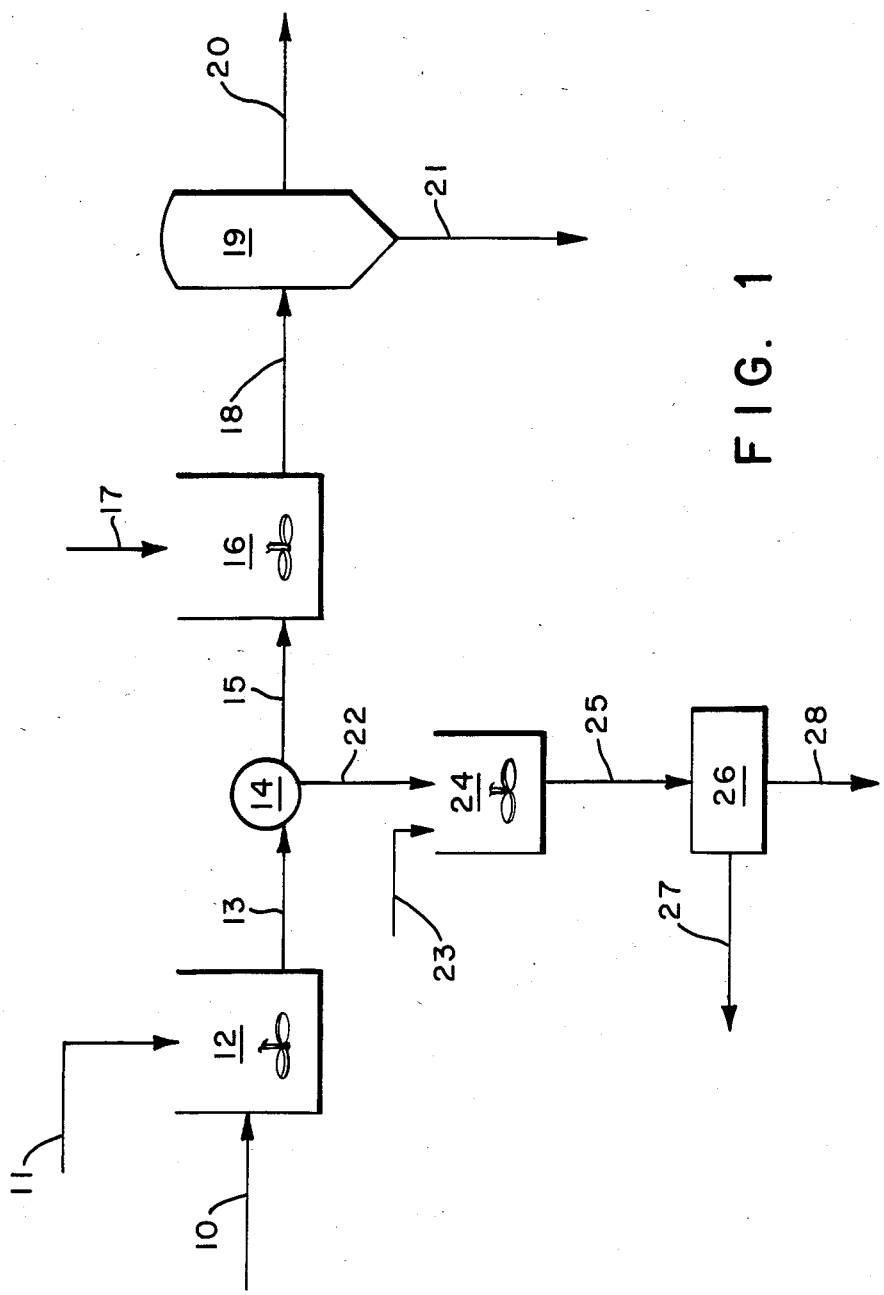
FIG. 1 of the drawing is a representative flow diagram of the soda ash recovery from trona purge liquors in accordance with the present invention.

To facilitate a description of the improved soda ash recovery method of the invention, the novel process will first be described in conjunction with the accompanying flow diagram of the drawing. As shown by reference to the drawing, magnesium oxide at 11 is mixed with purge liquor 10 in mix tank 12 at about 100° C. where the magnesium oxide reacts with silica to form a gelatinous magnesium silicate. Approximately 20 minutes is required to complete the reaction. Thereafter, the liquor 13, containing the solids, is withdrawn from mix tank 12, and processed in a disc bowl separator 14, to separate the excess magnesium oxide and magnesium silicate from the purge liquor. The purge liquor 15 is now free of silica and is mixed with soluble calcium and magnesium salts 17 in mix tank 16. The liquor 18 is transferred to a crystallizer 19, where a part (about 55–60%) of the original 100 parts of soda ash is recovered at 21 as monohydrate. This can be converted to dense ash and sold as a quality product. Build-up of impurities, such as sodium sulfate and organics, require that a portion (about 24 parts) of soda ash 20 be purged from the system.

The silica that is removed in the disc bowl separator 14, is gelatinous and voluminous and contains about 20 parts of the soda ash. When this gelatinous mixture 22 is diluted with water 23 in mix tank 24, an easily filterable mixture which is shown being withdrawn at 25, is obtained. The liquid 27 is separated from the solid 28 of mixture 25 in filter 26. Approximately 80% of the soda ash trapped in the gelatinous magnesium silicate of mixture 22 can be recovered and returned to the process for recovery. The magnesium silicate is discarded.

Approximately 72% of the soda ash in the purge liquor can be recovered as either saleable product or liquor that can be processed.

The material balance with respect to the flow lines in the diagram of FIG. 1, as described hereinabove, is summarized in Table A.

TABLE A

Flow Diagram of FIG. 1

| Line | 10 | 11 | 13 | 15 | 17 | 18 | 20 |
|---|---|---|---|---|---|---|---|
| Soda Ash | 100 | | 100 | 80 | | 80 | 24 |
| Silica | 1.5 | | | | | | |
| MgO | | 2.5 | 1.5 | | | | |
| MgSiO$_3$ | | | 2.5 | | | | |
| MgCl$_2$ | | | | | .05 | .05 | |
| CaCl$_2$ | | | | | .1 | .1 | |
| Na$_2$SO$_4$ | 12 | | 12 | 9.6 | | 9.6 | 9.6 |

| Line | 21 | 22 | 23 | 25 | 27 | 28 |
|---|---|---|---|---|---|---|
| Soda Ash | 56 | 20 | 20 | 16 | 4 | |
| Silica | | 1.5 | 1.5 | | 1.5 | |
| MgO | | 2.5 | 2.5 | | 2.5 | |
| MgCl$_2$ | | | | | | |
| CaCl$_2$ | | | | | | |
| MgCO$_3$ | .04 | | | | | |
| CaCO$_3$ | .09 | | | | | |
| Na$_2$SO$_4$ | | 2.4 | 2.4 | 1.9 | 0.5 | |

The invention, it is seen, deals with a purge stream obtained from calcined trona via the monohydrate process and involves essentially the addition of sodium bicarbonate, from an effective amount up to about 2 percent sodium bicarbonate. More particularly sodium bicarbonate is added to provide from about 0.1 to about 1.5 percent sodium bicarbonate in the purge stream.

The invention will be described in further detail by reference to the following specific examples. The enumeration of details should not be construed as a limitation on the invention except as may be set forth in the accompanying claims.

EXAMPLE I

The effectiveness of MgO for silica removal from Na$_2$CO$_3$ solutions depends on the concentrations of NaHCO$_3$ in the samples. Solutions of Na$_2$CO$_3$ having concentrations of about 30% Na$_2$CO$_3$ and containing sodium silicate (about ~3000 ppm SiO$_2$, weight basis) and NaHCO$_3$ from 0–0.8%, were mixed with MgO, heated to about 90° C. for 30 minutes and filtered. 1.9 gm of a commercial grade of magnesium oxide[1] were added to 250 gm of solution of 30% carbonate. The results are shown in Table 1.

[1] Magox 90-HR-325 obtained from Basic Chemical Co., Cleveland, Ohio.

TABLE 1

| | 250 gm ~30% Na$_2$CO$_3$ 3000 ppm SiO$_2$ 1.9 gm MgO | |
|---|---|---|
| % NaHCO$_3$ | SiO$_2$ in Solution After MgO Treatment ppm | % SiO$_2$ Removed ppm |
| 0 | 1205 | 60 |
| 0.2 | 990 | 67 |
| 0.4 | 741 | 75 |
| 0.6 | 298 | 90 |
| 0.8 | 219 | 93 |

It is seen that silica removal by MgO increases with an increase in bicarb concentration.

EXAMPLE II

The following run was performed using purge liquor from the plant first effect crystallizer, this liquor being shown fed at 10 in FIG. 1. The sulfate concentration of the liquor was increased to 3.4% Na$_2$SO$_4$ by dissolution of reagent grade Na$_2$SO$_4$. 10 gm of MgO were added to 1000 gm of the liquor, heated at 90° C. with stirring and filtered. Solutions of MgSO$_4$, CaCl$_2$ and Propoquad T/12-MS-DEG[2] (quaternary ammonium compound from Akzo Chemie, America) were added to 600 gm of the filtrate to give 0–300 ppm Mg, 0–500 ppm Ca and 60 ppm Propoquad defoamer, basis Na$_2$CO$_3$. The results are shown below in Table 2.

[2] (Tallow alkyl) methyl-bis(2-hydroxprophl)ammonium methosulfate from Akzo Chemie America, Chicago, Ill.

TABLE 2

| Original Purge Liquor | |
|---|---|
| Na$_2$CO$_3$ | 28.4% |
| NaHCO$_3$ | 0.8% |
| Na$_2$SO$_4$ | 3.4% |
| SiO$_2$ | 0.44% |
| After MgO treatment | |
| SiO$_2$ | 0.007% |

| Run # | Mg(ppm) (basis Na$_2$CO$_3$) | Ca, ppm (basis Na$_2$CO$_3$) | Mother Liquors | | Dense Ash Product | |
|---|---|---|---|---|---|---|
| | | | Weight gm | % Na$_2$SO$_4$ | Weight gm | % Na$_2$SO$_4$ |
| 1 | 0 | 0 | 310 | 3.56 | 102 | 4.9 |
| 2 | 150 | 500 | 313 | 6.2 | 103 | 0.0 |

The crystals in Run 2 of Example II were blocky and pseudo-cubic, whereas those in Run 1 of Example 2 were long and thin. Also, the product in Run 2 obtained with Ca and Mg treatment had no sulfate contamination although the mother liquor concentration of sulfate increased to 6.2% basis liquor. Additionally, the product from Run 1, without Ca and Mg treatment, had a relatively high sulfate level of 4.9%.

EXAMPLES III AND IV

In the following Examples the effect of NaHCO$_3$ and NaOH on product quality was investigated. In Example III the liquor after treatment with MgO was analyzed for NaHCO$_3$. In Example IV, NaOH was added to the liquor before MgO treatment and analyzed after the treatment. In both runs Ca and Mg were added as shown below.

TABLE 3

| Example No. | % NaHCO$_3$ | % NaOH | Ca ppm, (basis Na$_2$CO$_3$) | Mg ppm, (basis Na$_2$CO$_3$) | Dense Ash Product Weight | % Na$_2$SO$_4$ |
|---|---|---|---|---|---|---|
| III | 0.8 | 0 | 300 | 150 | 132 | 0.3 |
| IV | 0.0 | 0.6 | 300 | 150 | 137 | 3.5 |

It is seen that sulfate rejection by the product dense ash is greater when the liquor contains NaHCO$_3$ instead of NaOH.

EXAMPLE V

Continuous Crystallization Run

In this run 15,000 gm of MgO treated purge liquor were fed continuously to the crystallizer and monohydrate crystal slurry withdrawn every hour. A solution of $MgCl_2$, $CaCl_2$ and Propoquad T/12-MS-DEG was added to the crystallizer in measured amounts every ½ hour to maintain a level of 500 ppm Ca, 300 ppm Mg and 60 ppm Propoquad, basis $Na_2CO_3$. The monohydrate crystal slurry was centrifuged and the mother liquor saved. After 14.5 hours, the 15,000 gm feed to the crystallizer was used up and the mother liquor was fed to the crystallizer. The monohydrate crystal slurry was withdrawn every hour, the crystals centrifuged and the mother liquor saved. After 20.75 hours of operation the second mother liquor was fed. After 24.0 hours the third mother liquor was fed to the crystallizer. The run was terminated after 26 hours of operation. The product crystals at the end of the run contained 0.04% $Na_2SO_4$ and 130 ppm organics but the blocky pseudo-cubic shape was maintained.

Some pertinent data are shown in Table 4.

TABLE 4

| | $Na_2CO_3$ (%) | $NaHCO_3$ (%) | $Na_2SO_4$ (%) | $SiO_2$ (ppm) | Organics (ppm) |
|---|---|---|---|---|---|
| Starting MgO treated liquor | 28.1 | 2.0 | 1.1 | 45 | 755 |
| Final bed liquor | 23.9 | 2.0 | 4.9 | 1380 | 3252 |
| Washed bed crystal | 86.0 | 0.8 | 0.11 | 68 | 241 |

The bed crystals were washed with a saturated solution of pure $Na_2CO_3$. It is seen that the final bed crystals have low impurity contamination in spite of the high concentration of impurities in the final bed liquor.

Figure 2:
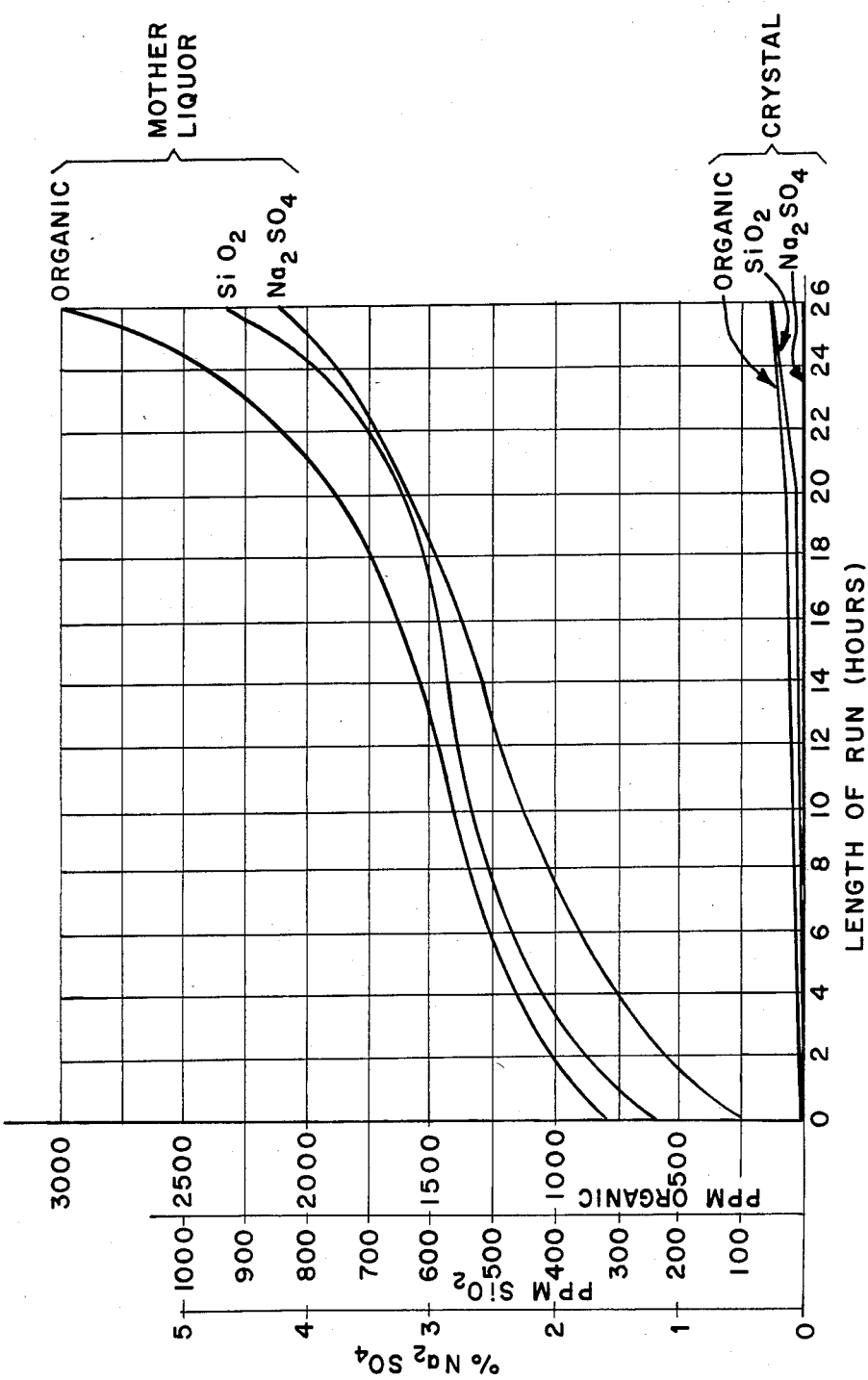
FIG. 2 is a diagram comparing the relative change, i.e. build up in impurities in the mother liquor and in the product crystals as a function of time.

The impurities in mother liquor and the crystals as a function of time are shown in FIG. 2. After 20 hours, there is a steep rise in impurity levels in the mother liquor but a low level of impurities is maintained in the product crystals.

It will be understood the invention should not be limited to the several details provided to afford a preferred illustrative operation and, therefore, a more complete description of the invention, except as such details may be expressed in the claims which follow.

What is claimed is:

1. A process for preparing pure anhydrous sodium carbonate crystal from impure purge liquor obtained from calcined trona via the monohydrate process and containing silica, organic material and sulfate impurities comprising the steps of
    (1) treating the purge liquor with magnesium oxide and by the addition of an effective amount and up to about 2 percent sodium bicarbonate;
    (2) separating the insoluble reaction product from the mother liquor;
    (3) adding soluble calcium and magnesium salts to the separated mother liquor;
    (4) evaporating the treated resulting solution from step (3) to yield sodium carbonate monohydrate crystals;
    (5) separating the formed crystals from the mother liquor; and
    (6) heating the crystals thus derived to a temperature of at least about 140° C. to convert the crystals to a dense sodium carbonate product.

2. The process of claim 1 wherein the liquor of step (1) is adjusted to contain from 0.1 to about 1.5 percent sodium bicarbonate and from about 0.5 to about 1.5 percent magnesium oxide.

3. The process of claim 1 wherein the crystals separated in step (5) are heated within a range of about 150° C. to about 200° C.

4. The method of claim 2 wherein the amount of magnesium oxide employed comprises about 2.5 times the stoichiometric concentration of the silicon dioxide in the purge liquor.

5. The liquor from claim 2 is treated with 10–300 ppm Mg (basis $Na_2CO_3$) in the form of soluble magnesium salt and 100–500 ppm Ca (basis $Na_2CO_3$) in the form of a soluble Ca salt and a quaternary ammonium compound 20–100 ppm (basis $Na_2CO_3$) is added to prevent foaming during evaporation.

6. The liquor in claim 5 is evaporated at 70°–100° C. until the concentration of sulfate increases to about 5.0–7.0% $Na_2SO_4$ in the mother liquor, the monohydrate crystals separated and washed with a saturated sodium carbonate solution or small amount of water to remove the adhering mother liquor.

7. The crystals obtained in claim 6 are heated at 150°–200° C. to convert to dense ash with a pseudo-cubic crystal shape, a bulk density of about 1100 grams per liter, sulfate impurity less than 0.1% $Na_2SO_4$ and $SiO_2$ impurity less than 100 ppm.

* * * * *